W. I. PRIDE & H. O. SCHROETER.
NUT LOCK.
APPLICATION FILED JUNE 26, 1912.
1,079,880.
Patented Nov. 25, 1913.
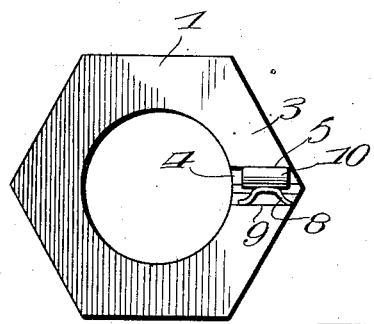
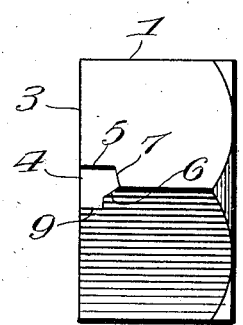
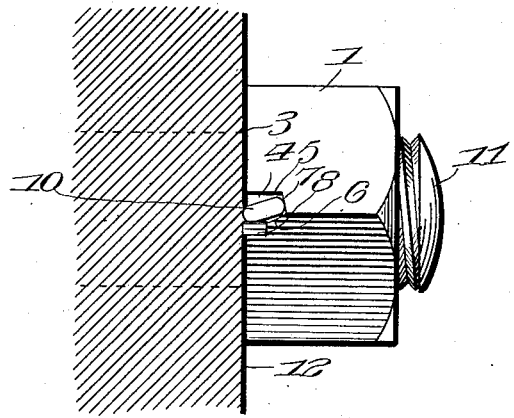
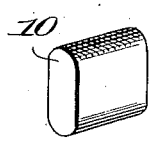
Witnesses
Inventor
William I. Pride &
Hugo O. Schroeter
By Victor J. Evans
Attorney
COLUMBIA PLANOGRAPH CO., WASHINGTON, D. C.

UNITED STATES PATENT OFFICE.

WILLIAM I. PRIDE AND HUGO O. SCHROETER, OF PAWTUCKET, RHODE ISLAND.

NUT-LOCK.

1,079,880. Specification of Letters Patent. Patented Nov. 25, 1913.

Application filed June 26, 1912. Serial No. 706,083.

*To all whom it may concern:*

Be it known that we, WILLIAM I. PRIDE and HUGO O. SCHROETER, a citizen of the United States and a subject of the Emperor of Germany, respectively, residing at Pawtucket, in the county of Providence and State of Rhode Island, have invented new and useful Improvements in Nut-Locks, of which the following is a specification.

This invention relates to nut locks, the object in view being to provide simple means, consisting of a locking dog so combined with the nut as to swing into contact with the surface against which the nut is screwed, and bind against such surface to prevent the nut from turning backward or working loose.

A further object of the invention is to combine with such dog a spring which will force the dog into a position which will cause it to bind against the surface upon which the nut bears.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is an inner face view of a nut, showing the locking device of this invention applied thereto. Fig. 2 is a side or edge elevation of the nut. Fig. 3 is an end view, showing the nut applied to a bolt and bearing against a surface shown in section, also illustrating the operation of the locking dog. Fig. 4 is a detail perspective view of the locking dog. Fig. 5 is a similar view of the spring.

Referring to the drawings, 1 designates a nut of any desired size, and while shown as of the hexagonal type, it will, of course, be understood that the nut may be square, or it may be provided with any number of sides for the application of a suitable wrench thereto.

In carrying out this invention, the inside face 3 of the nut is provided with a radially extending channel or recess 4, one of the side walls 5 of which is preferably at right angles to the inner face 3 of the nut, while the other side wall 6 of said recess is inclined and diverges from the wall 5 toward the inner face 3 of the nut. The channel or recess 4 is open at both ends extending from the bolt hole of the nut to the outer face thereof, so as to give access to the locking dog exteriorly of the nut for disengaging the same when it is desired to unlock and loosen the nut.

The base or inner wall 7 of the recess is preferably inclined or oblique with respect to the inner face of the nut, as shown, so as to assist in urging the outer face of the dog outward, as said dog swings in the recess.

8 designates a spring which is arranged behind the dog at one side thereof, and which is seated in an extension 9 of the recess 4, so as to admit of a full swinging movement of the dog, said spring serving to urge the dog toward a position at right angles to the inside face of the nut, causing said dog to bind the nut against working loose.

The dog 10 is made slightly greater in extent than the depth of the recess 4, and the inner end of the dog rocks or fulcrums on the base 7 of the recess.

11 designates a portion of the bolt in connection with which the nut is used, and 12 designates the surface against which the nut bears when turned to its final position.

It will now be observed, by reference to the drawings, that in turning the nut up, the dog 10 is adapted to compress the spring 8 in the recess 9, until the nut reaches its final tightened position, whereupon any tendency of the nut to work loose, causes the dog to bind against the surface 12, which operation is assisted by the spring 8 which tends to throw the dog into a position at right angles to the surface 12, causing said dog to bind firmly against said surface and hold the nut locked.

If desired, the binding face of the dog may be roughened, scored, or knurled to increase its binding and gripping effect, and while the spring 8 is shown as a flat bowed spring, it will be obvious that a coiled spring or a spring of any other desired shape may be used in lieu thereof.

It will also be apparent that a washer may be introduced between the nut and the surface 12 if desired.

What is claimed is:

In a nut lock, a nut provided in its bearing face with a channel extending radially from the bolt hole outwardly and open at both ends, and a dog of uniform width and straight from end to end inserted in said channel and detached from the nut and adapted to turn on its major axis until one side thereof binds against the bottom of said
5 channel and another side thereof binds against the surface upon which the nut bears.

In testimony whereof we affix our signatures in presence of two witnesses.

WILLIAM I. PRIDE.
HUGO O. SCHROETER.

Witnesses:
ERASTUS O. CLARK,
IDA AYOTTE.

Copies of this patent may be obtained for five cents each, by addressing the "Commissioner of Patents, Washington, D. C."